(12) United States Patent
Collins et al.

(10) Patent No.: US 10,947,729 B2
(45) Date of Patent: Mar. 16, 2021

(54) ROOFING SHINGLES AND ROOFING METHOD

(71) Applicant: Atlas Roofing Corporation, Meridian, MS (US)

(72) Inventors: Meldrin Collins, Lawrenceville, GA (US); Brad Parten, Collinsville, MS (US); Hazem Shanab, Fayetteville, GA (US); Dale Rushing, Canton, GA (US); Walid Amad, McDonough, GA (US)

(73) Assignee: Atlas Roofing Corporation, Meridian, MS (US)

( * ) Notice: Subject to any disclaimer, the term of this patent is extended or adjusted under 35 U.S.C. 154(b) by 0 days.

(21) Appl. No.: 15/988,277

(22) Filed: May 24, 2018

(65) Prior Publication Data

US 2019/0360208 A1    Nov. 28, 2019

(51) Int. Cl.
*E04D 1/26* (2006.01)
*B32B 3/26* (2006.01)
(Continued)

(52) U.S. Cl.
CPC .......... *E04D 1/26* (2013.01); *B32B 3/26* (2013.01); *B32B 7/12* (2013.01); *B32B 11/04* (2013.01); *B32B 11/12* (2013.01); *B32B 2419/06* (2013.01)

(58) Field of Classification Search
CPC ....... E04D 1/20; E04D 1/26; E04D 2001/005; E04D 1/265; E04D 1/28; E04D 1/29;
(Continued)

(56) References Cited

U.S. PATENT DOCUMENTS 1,549,723 A    8/1925  Mattison
3,217,870 A *  11/1965  Davis .................. E04D 1/26
                                              206/324

(Continued)

FOREIGN PATENT DOCUMENTS

CA         2 448 498 A1    10/2004

OTHER PUBLICATIONS

Building Products of Canada Corp., Technical Data Sheet: Asphalt Shingles, Mystique 42 inch (RL621), TDS-MYSTIQUE RL621-07-12-2017.doc, Jul. 12, 2017, 1 page.
(Continued)

*Primary Examiner* — Jessie T Fonseca
(74) *Attorney, Agent, or Firm* — Nixon & Vanderhye P.C.

(57) ABSTRACT

A roofing shingle (20) comprises a web (22) of roofing material configured with a first series of sealant material sites (60) and a second series of sealant material sites (62) provided on the roofing shingle (20). The web (22) of roofing material is configured with a length dimension (L) and a width dimension (W). The sealant material sites 60 of the first series are provided along a first axis (66) which is essentially parallel to the length dimension of the web. The sealant material sites (60) of the first series are discontinuous along the first axis (66) and separated from one another along the first axis by a first interval (70). The sealant material sites of the second series (62) are provided along a second axis (68) which is essentially parallel to the length dimension of the web and spaced apart from the first axis (66) with respect to the width dimension. The sealant material sites (62) of the second series are discontinuous along the second axis (68) and are separated from one another along the second axis (68) by a second interval (72), the second interval (72) being different than the first interval (70).

22 Claims, 11 Drawing Sheets

(51) Int. Cl.
*B32B 11/04* (2006.01)
*B32B 11/12* (2006.01)
*B32B 7/12* (2006.01)

(58) Field of Classification Search
CPC ....... E04D 1/36; E04D 1/2918; E04D 1/2963; Y10S 52/16; Y10T 428/24793
See application file for complete search history.

(56) References Cited

U.S. PATENT DOCUMENTS

| | | | |
|---|---|---|---|
| 3,407,556 A | | 10/1968 | Leibrook |
| 4,637,191 A | * | 1/1987 | Smith ...................... E04D 1/26 52/522 |
| 5,287,669 A | | 2/1994 | Hannah et al. |
| 5,305,569 A | * | 4/1994 | Malmquist ................ E04D 1/26 52/309.14 |
| 5,375,491 A | | 12/1994 | Hannah et al. |
| D355,494 S | | 2/1995 | Fenske |
| 5,421,134 A | | 6/1995 | Hannah et al. |
| 5,501,056 A | | 3/1996 | Hannah et al. |
| 5,611,186 A | * | 3/1997 | Weaver ...................... E04D 1/26 52/314 |
| 5,666,776 A | * | 9/1997 | Weaver ...................... E04D 1/26 52/314 |
| 5,950,387 A | * | 9/1999 | Stahl ........................ E04D 1/26 52/555 |
| 6,014,847 A | | 1/2000 | Phillips |
| 6,145,265 A | | 11/2000 | Malarkey et al. |
| 6,289,648 B1 | * | 9/2001 | Freshwater ............. D06N 5/00 52/314 |
| 6,397,546 B1 | | 6/2002 | Malarkey et al. |
| 6,968,662 B2 | | 11/2005 | Rodrigues |
| 7,204,063 B2 | | 4/2007 | Kandalgaonkar |
| 7,833,371 B2 | | 11/2010 | Binkley |
| 8,240,100 B2 | | 8/2012 | Kalkanoglu |
| 8,898,987 B1 | | 12/2014 | Amatruda |
| 8,915,037 B2 | * | 12/2014 | Jenkins ..................... E04D 1/26 52/420 |
| 8,984,835 B2 | * | 3/2015 | Kalkanoglu ........ B32B 37/1284 52/105 |
| D792,576 S | | 7/2017 | Mayes |
| 10,174,504 B1 | | 1/2019 | Freiborg |
| 10,180,003 B2 | | 1/2019 | Freiborg |
| 2006/0265989 A1 | * | 11/2006 | Geary ...................... E04D 1/26 52/518 |
| 2007/0068108 A1 | * | 3/2007 | Kiik .......................... E04D 1/26 52/518 |
| 2007/0261337 A1 | * | 11/2007 | Whitaker ............ C04B 20/1018 52/300 |
| 2009/0139175 A1 | | 6/2009 | Todd et al. |
| 2009/0158685 A1 | * | 6/2009 | Swanson .................. E04D 1/26 52/543 |
| 2009/0220720 A1 | | 9/2009 | Mohseen |
| 2015/0089895 A1 | * | 4/2015 | Leitch ...................... E04D 1/28 52/518 |
| 2015/0240495 A1 | | 8/2015 | Vermilion |
| 2017/0321423 A1 | | 11/2017 | Aschenbeck |
| 2017/0362830 A1 | | 12/2017 | Buckingham |

OTHER PUBLICATIONS

Building Products of Canada Corp., Technical Data Sheet: Asphalt Shingles, Vangard 42 IR (RL833), TDS-VANGARD IR-04-12-2017.doc, Apr. 12, 2017, 1 page.
Building Products of Canada Corp., Technical Data Sheet: Asphalt Shingles, Everest 42 inch (RL442), TDS-EVEREST RL442-07-12-2017.doc, Jul. 12, 2017, 1 page.
42" Shingles Archives—BP Canada, https://bpcan.com/cat-produits/42-shingles/, accessed Feb. 28, 2018, 3 pages.
Notice of Allowance dated Nov. 27, 2019 in Design U.S. Appl. No. 29/648,855.
Final Office Action dated Aug. 15, 2019 in Design U.S. Appl. No. 29/648,855.
Office Action dated Apr. 18, 2019 in Design U.S. Appl. No. 29/648,855.
Wind Resistance—HP42 Atlas Roofing (on-line), dated Jul. 26, 2017. Retrieved from Internet Apr. 13, 2020, URL: https://web.archive.org/web/20170726055710/https://www.atlasroofing.conn/roof-shingles/wind-resistance (5 pages) (Year: 2018).

* cited by examiner

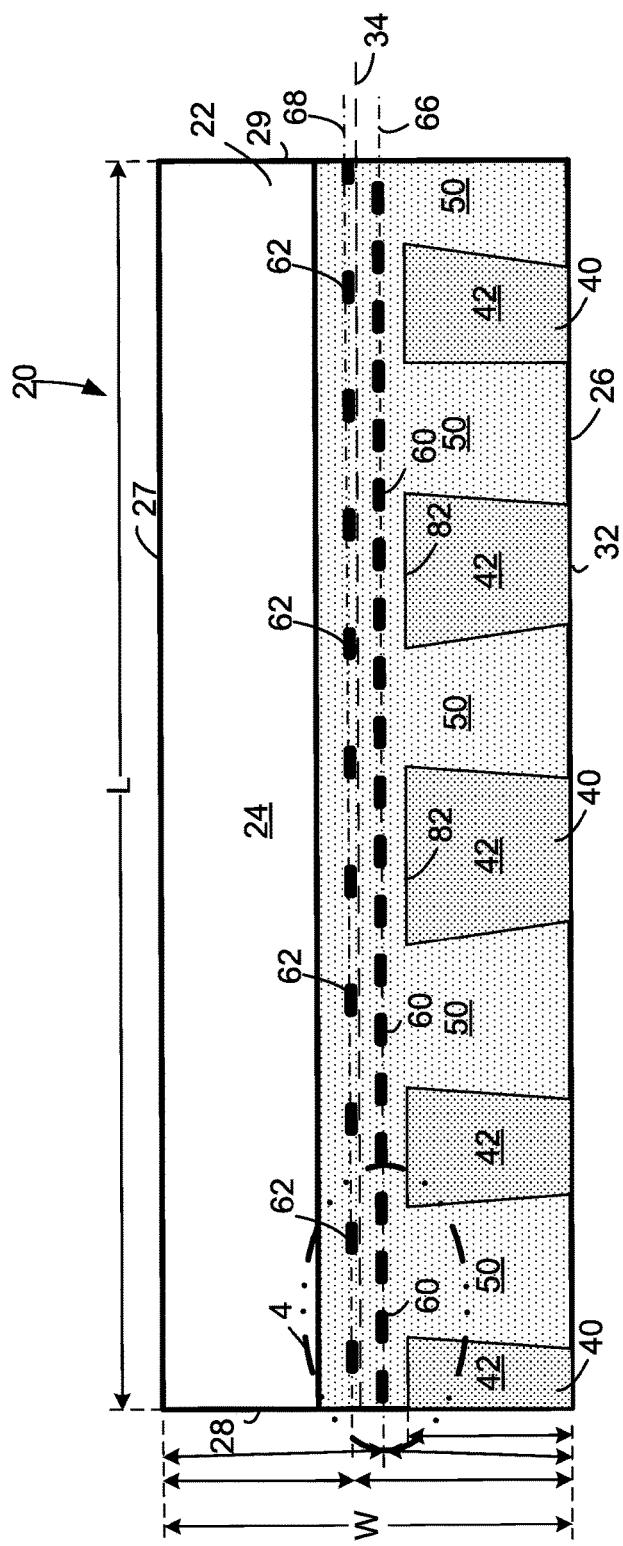
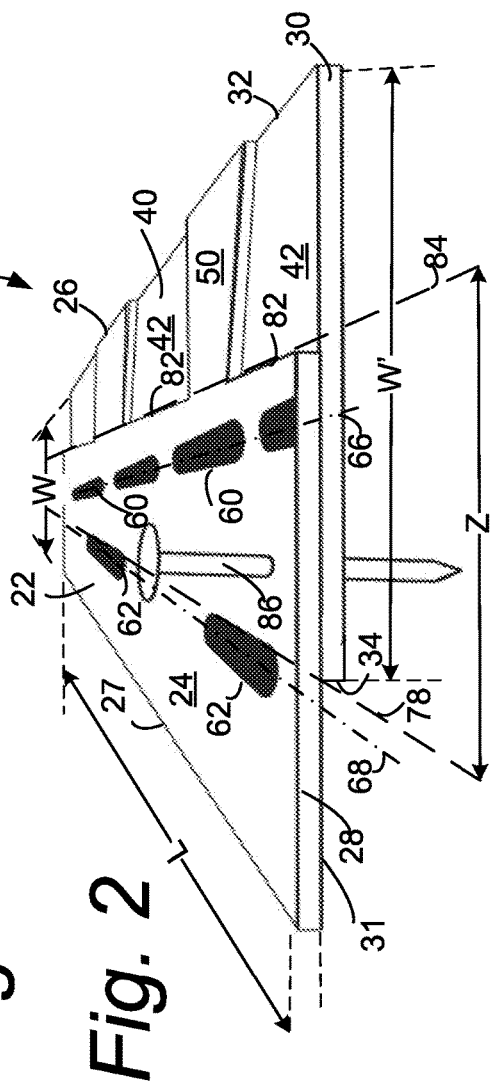
Fig. 1
Fig. 2

```
┌─────────────────────────────────────────────────────────────┐ 11-1
│  FOR A FIRST COURSE OF INSTALLATION, APPLYING AN            │
│  ENTIRE SHINGLE TO THE UNDERLAYMENT OF THE ROOF             │
└─────────────────────────────────────────────────────────────┘
                              │
                              ▼
┌─────────────────────────────────────────────────────────────┐ 11-2
│ FOR EACH OF X = 2, ... J COURSES OF INSTALLATION:           │
│ (A) FORMING FROM A $X^{TH}$ SHINGLE, IN WHICH A $X^{TH}$    │
│ SHINGLE MAJOR PORTION HAS A LENGTH L-((X-1)*I) AND A        │
│ $X^{TH}$ SHINGLE MINOR PORTION HAVING A LENGTH L – L –      │
│ ((X-1)* I;                                                  │
│ (B) APPLYING THE $X^{TH}$ SHINGLE MAJOR PORTION OVER AT     │
│ LEAST A PORTION OF AN $X-1^{TH}$ SHINGLE MAJOR PORTION      │
│ AND TO THE UNDERLAYMENT                                     │
└─────────────────────────────────────────────────────────────┘
                              │
                              ▼
┌─────────────────────────────────────────────────────────────┐ 11-3
│  FOR EACH OF Y = J+1, ... C COURSES OF INSTALLATION,        │
│  APPLYING ONE OF THE $X^{TH}$ SHINGLE MINOR PORTIONS        │
│  OVER AT LEAST A PORTION OF COURSE Y-1 AND TO THE           │
│                      UNDERLAYMENT                           │
└─────────────────────────────────────────────────────────────┘
```

*Fig. 11*

ROOFING SHINGLES AND ROOFING METHOD

U.S. Design patent application 29/648,855, filed May 23, 2018, entitled "Roofing Shingle" is incorporated by reference herein in its entirety.

TECHNICAL FIELD

This invention pertains to roofing shingles and methods of affixing roofing shingles to a sloped roof.

BACKGROUND

Roofing shingles are some of the most prevalent forms of roofing materials. Roofing shingles are particularly popular for residential buildings. While shingle appearance and design must be appealing, shingle manufacture and installment should be efficient and economical.

Shingle production typically involves feeding a substrate into a production line. In the production line, hot asphalt is applied to the substrate. Granules are deposited and embedded into the substrate. The granules which are embedded into what will be, upon installation, an exposed portion of the substrate, are often called "finish" granules, and may be of a particular color or combination of colors. Typically less colorful or less esthetically appealing granules are embedded into an un-exposed or headlap portion of the substrate. The granule laden substrate is then cut to a package length, e.g. into a package unit, along a major dimension of the shingle. For many general purpose shingles the package unit has a number of tabs on its lower or exposed surface which are separated by slots which extend in a minor dimension (e.g., height) of the shingle.

Large format shingles have become popular in some markets. An advantage in using large format shingles is that fewer nails are required to secure the shingle to a roof. Examples of large format shingles include, for example, those shown and described in U.S. Pat. Nos. 5,501,056; 5,375,491; 5,421,134; 5,287,669; and United States Patent Publication 2009/0139175.

United States Patent Publication 2009/0139175 also shows an example wherein sealant stripes are provided on a shingle, and wherein the sealant stripes are staggered to form offset channels to facilitate drainage. U.S. Pat. No. 7,204,063 also describes sealant stripes.

The sealant stripes may boarder a nailing zone. Other US patents that refer to a nailing zone or sealant stripes include U.S. Pat. Nos. 6,145,265 and 6,397,546.

What is needed, therefore, and an example object of the technology disclosed herein, is a roofing shingle that is configured to promote both drainage and wind resistance without excessive sealant material, and which is readily installable on a roof with essentially no shingle waste or extensive nailing.

SUMMARY

In one of its example aspects the technology disclosed herein concerns a roofing shingle comprising a web of roofing material configured with a first series of sealant material sites and a second series of sealant material sites provided on the shingle. The web of roofing material is configured with a length dimension and a width dimension. The sealant material sites of the first series are provided along a first axis which is essentially parallel to the length dimension of the web. The sealant material sites of the first series are discontinuous along the first axis and separated from one another along the first axis by a first interval. The sealant material sites of the second series are provided along a second axis which is essentially parallel to the length dimension of the web and are spaced apart from the first axis with respect to the width dimension. The sealant material sites of the second series are discontinuous along the second axis and separated from one another along the second axis by a second interval, the second interval being different than the first interval.

In an example embodiment and mode, the second interval is greater than the first interval, In an example embodiment and mode, a first edge of the shingle along the length dimension comprises at least one cut-out to form at least one tab. With respect to the width dimension of the shingle, the second series of sealant material sites is farther than the first series of sealant material sites to the first length edge of the shingle. In an example implementation, the shingle further comprises a backing sheet secured to a lower surface of the web, the lower surface of the web being opposite the face of the web. The backing sheet being is with essentially a same length dimension as the web but with a smaller width dimension than the web. A first length edge of the backing sheet is substantially aligned with the first length edge of the shingle and a second length edge of the backing sheet is substantially aligned under the web with at least an edge of the sealant material sites of the second series.

In an example embodiment and mode, at least one cut-out comprises a cut-out length edge that is parallel to the length dimension of the shingle, and a nailing zone distance of a nailing zone in the width dimension from the cut-out length edge to the second series of sealant material sites is substantially 1.5 inches. In an example implementation, with respect to the width dimension of the shingle the nailing zone is substantially six inches from the first length edge of the shingle.

In an example embodiment and mode, a ratio of the length dimension of the shingle to the width dimension of the shingle is 3:1. In an example implementation, a length of the shingle along the length dimension is 42 inches and a width of the shingle along the width dimension is 14 inches. In an example implementation, the length of the second interval is three inches and the length of the first interval is one inch.

In an example embodiment and mode, the sealant material sites of the first series and the second series have a length in the length dimension of substantially 1 inch and a width in the width dimension of substantially ⅜ inch.

In an example embodiment and mode, with respect to the length dimension a first site of the second series of sealant material sites is substantially aligned between neighboring first and second sites of the first series of sealant material sites, and a second site of the second series of sealant material sites which neighbors the first site of the second series of sealant material sites is substantially aligned between neighboring third and fourth sites of the first series of sealant material sites.

In another of its aspects the technology disclosed herein concerns a method of installing roofing shingles on a roof. Each of the shingles comprises a web configured with a length dimension of L=C*I units of measure, L and I being even integers of a measurement unit and C being an odd integer of the measurement unit. The method comprises an act (1) comprising, for a first course of installation, applying an entire shingle to the underlayment of the roof. Act (2) of the method comprises, for each of X=2, . . . J courses of installation, J being an integer: (a) forming from an Xth shingle, in which an Xth shingle major portion having a length L−((X−1)*I) and an Xth shingle minor portion having a length L−L−((X−1)*I; (b) applying the Xth shingle major portion over at least a portion of an X−1th shingle major portion and to the underlayment. Act (3) of the method comprises, for each of Y=J+1, . . . C courses of installation, applying one of the Xth shingle minor portions over at least a portion of course Y−1 and to the underlayment. In the method edges of the shingle major portions and shingle minor portions applied for courses 2−C are substantially aligned in the length dimension with an edge of the entire shingle applied for the first course.

In an example embodiment and mode the measurement unit is inches.

In an example embodiment and mode the web of each shingle is configured with a width W in a width dimension, and wherein W=L/3.

In an example embodiment and mode each shingle comprises a first series of sealant material sites and a second series of sealant material sites provided on the shingle, and a backing sheet. The sealant material sites of the first series is provided along a first axis which is essentially parallel to the length dimension of the web. The sealant material sites of the first series are discontinuous along the first axis and separated from one another along the first axis by a first interval. The sealant material sites of the second series being are along a second axis which is essentially parallel to the length dimension of the web and spaced apart from the first axis with respect to the width dimension. The sealant material sites of the second series are discontinuous along the second axis and separated from one another along the second axis by a second interval. The second interval being different than the first interval. The backing sheet is secured to a lower surface of the web, the lower surface of the web being opposite the face of the web. The backing sheet is configured with essentially a same length dimension as the web but with a smaller width dimension than the web, a first length edge of the backing sheet being aligned with the first length edge of the shingle and a second length edge of the backing sheet being substantially aligned under the web with at least an edge of the sealant material sites of the second series. The at least one cut-out comprises a cut-out length edge that is parallel to the length dimension of the shingle. In this example embodiment and mode the method further comprises applying the shingle major portions and the shingle minor portions of the respective courses comprises nailing the shingle major portions and the shingle minor portions in a nailing zone of the respective shingle major portions and the shingle minor portions. The nailing zone extends substantially 1.5 inches in the width dimension from the cut-out length edge to the second series of sealant material sites.

In another of its example aspects the technology disclosed herein concerns a roofing shingle comprising a web of roofing material configured with a length dimension and a width dimension; and at least a first series of sealant material sites provided on the shingle. The sealant material sites of the first series are provided along a first axis which is essentially parallel to the length dimension of the web. The sealant material sites of the first series being discontinuous along the first axis and separated from one another along the first axis by a first interval. A number of sealant material sites provided on the shingle is equal to or greater than 18. In an example implementation, a ratio of the length dimension of the shingle to the width dimension of the shingle is 3:1; and the length dimension is substantially 42 inches.

In an example embodiment and mode, L=42, C=7, and I=6, and the method further comprises: (i) for the first course of installation, applying the entire first shingle to the underlayment of the roof; (ii) for the second course of installation, removing a 6 inch length of a second shingle and applying a remaining 36 inch portion of the second shingle over a portion of the first shingle and to the underlayment whereby along the length dimension an edge of the first shingle is substantially aligned with an edge of the remaining 36 inch portion of the second shingle; (iii) for the third course of installation, removing a 12 inch length of a third shingle and applying a remaining 30 inch portion of the third shingle over a portion of the 36 inch portion of the second shingle and to the underlayment whereby along the length dimension an edge of the 36 inch portion of the second shingle is substantially aligned with an edge of the remaining 30 inch portion of the third shingle; (iv) for the fourth course of installation, removing an 18 inch length of a fourth shingle and applying a remaining 24 inch portion of the fourth shingle over a portion of the 30 inch portion of the third shingle and to the underlayment whereby along the length dimension an edge of the 30 inch portion of the third shingle is substantially aligned with an edge of the remaining 24 inch portion of the fourth shingle; (v) for the fifth course of installation, applying a removed 18 inch length of shingle over a portion of the 24 inch portion of the fourth shingle and to the underlayment whereby along the length dimension an edge of the 24 inch portion of the fourth shingle is substantially aligned with an edge of the removed 18 inch length of shingle; (vi) for the sixth course of installation, applying a removed 12 inch length of shingle over the removed 18 inch length of shingle and to the underlayment whereby along the length dimension an edge of the removed 18 inch length of shingle is substantially aligned with an edge of the removed 12 inch length of shingle; and, (vii) for the seventh course of installation, applying a removed 6 inch length of shingle over the removed 12 inch length of shingle and to the underlayment whereby along the length dimension an edge of the removed 12 inch length of shingle is substantially aligned with an edge of the removed 6 inch length of shingle. In an example implementation, the removed 18 inch length of shingle is removed from the fourth shingle; the removed 12 inch length of shingle is removed from the third shingle; and the removed 6 inch length of shingle is removed from the second shingle.

In an example embodiment and mode, wherein the method further comprises, after performing acts (1)-(4), applying one or more entire shingles to each of the C courses to abut a shingle, a shingle major portion, or a shingle minor portion already in the respective course; optionally installing further courses according to acts (1)-(4); and wherein 56 shingles are installed per average square with substantially no shingle waste.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 1 is a plan view of a roofing shingle according to a first example embodiment and mode.

FIG. 2 is an isometric left end view of the roofing shingle of FIG. 1, showing an application point for an installation nail.

FIG. 11 is a flowchart showing example acts or steps involved in a generic mode of a roofing method.

DETAILED DESCRIPTION

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail.

Figure 3:
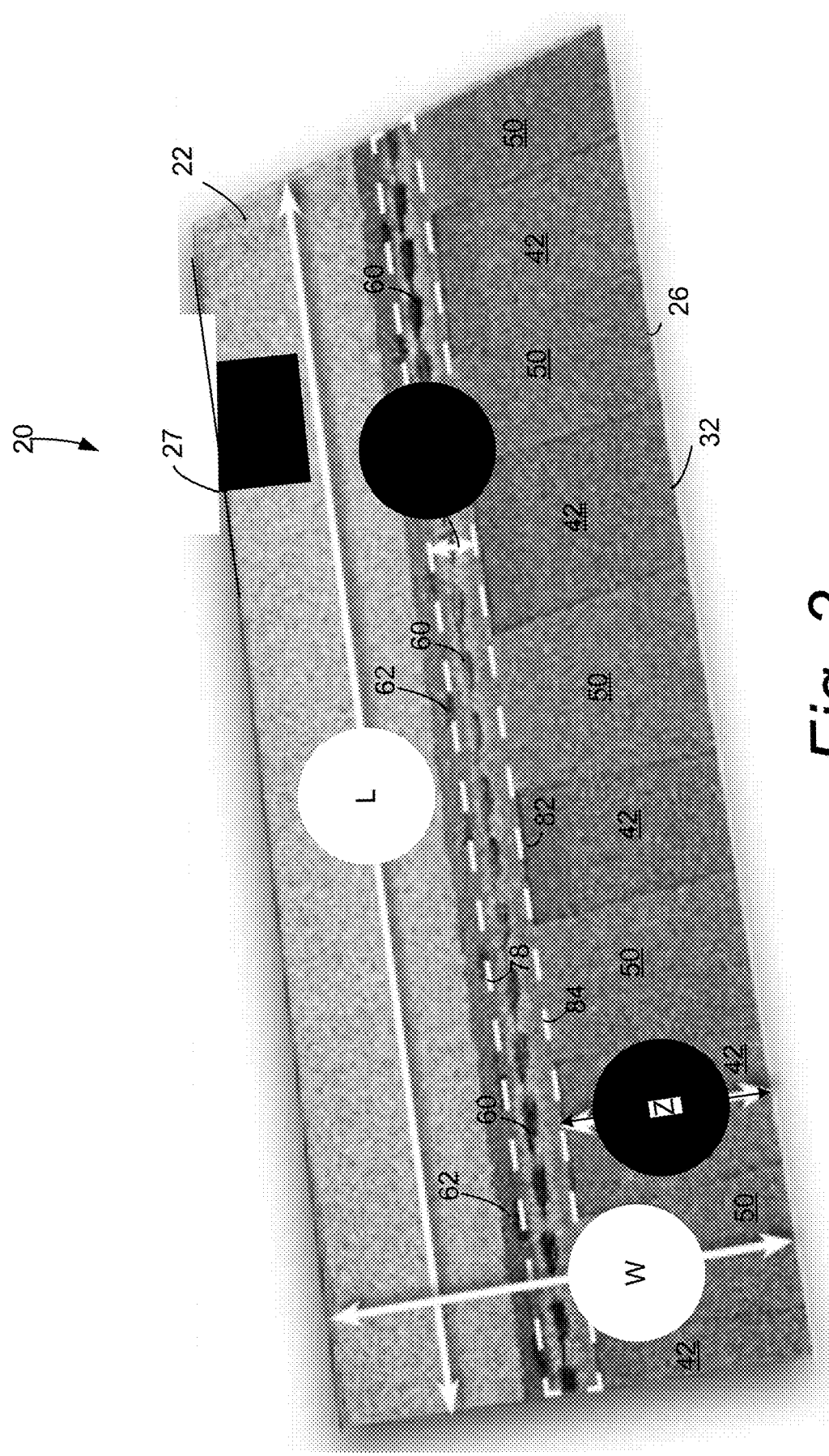
FIG. 3 is a top perspective view of the roofing shingle of FIG. 1.

FIG. 1-FIG. 3 show a roofing shingle 20 which, e.g., as described herein, is configured to provide strong shingle-to-shingle adhesion while also facilitating moisture egression from between shingles, and to provide an installation-friendly nailing zone. As also described herein, the structure and features of the roofing shingle 20 engender a substantially waste-free shingle installation method which is relatively oblivious to roof slope.

As shown in FIG. 1 and FIG. 2, roofing shingle 20 is essentially rectangular in overall footprint and has length dimension L and width dimension W. In the non-limiting example embodiment and mode of FIG. 1 and FIG. 2, the roofing shingle 20 comprises a web 22 of roofing material which comprises an upper surface or web face 24. The roofing shingle 20 and its web 22 have a first or lower length edge 26 which, upon installation of the roofing shingle 20 on a roof, will be lower on the roof than a second or upper length edge 27. The roofing shingle 20 and its face 24 also have a left width edge 28 and right width edge 29. The first length edge 26 and second or upper length edge 27 are essentially parallel with the length dimension L; the left width edge 28 and right width edge 29 are essentially parallel with the width dimension W, and thus perpendicular to the first length edge 26 and second or opposite length edge 27.

In a non-limiting example embodiment and mode shown in FIG. 1 and FIG. 2, the roofing shingle 20 is a laminated two-layer shingle, wherein web 22 serves as a top layer and a backing sheet 30 serves as a lower layer of the two-layer laminated roofing shingle 20. The backing sheet 30 is secured to a lower surface 31 of the web 22, the lower surface of the web being opposite the web face 24. The backing sheet 30 has a same length along length dimension L as the web 22, with backing sheet first length edge 32 and backing sheet rear length edge 34, both of which are parallel to the length dimension L. The backing sheet first length edge 32 is essentially aligned with the web first length edge 26, but the backing sheet rear length edge 34 underlies an intermediate portion of the web 22, thereby giving the backing sheet 30 a width W' which is less than W, e.g., W'<W, as shown in FIG. 2. Thus, backing sheet 40 has essentially a same length dimension L as the web 22 but with a smaller width dimension W' than the web 22. The backing sheet has a backing sheet top surface 36 and a backing sheet rear surface 38.

The first length edge 26 of the shingle comprises at least one and preferably plural cut-outs 40. The non-limiting example of FIG. 1 shows four full and one partial cut-out 40 (the partial cut-out being the left-most cut-out 40 in FIG. 1). The cut-outs 40 may have a rectangular or (more preferably) a quasi-trapezodial shape. Different numbers and different shapes of cut-outs 40 may be provided in other examples. Backing segments 42 of a top surface of backing sheet 30, having shapes corresponding to the cut-outs 40, are exposed through the cut-outs 40. Between adjacent cut-outs 40 a shingle tab 50 is provided on web 22. FIG. 1 shows five shingle tabs 50, but it should be understood that the number of cut-outs 40 and shingle tabs 50 can vary in different embodiments. Preferably the exposed backing segments 42 have a texture, color, or pattern or type of granule application that is different or visibly contrasting with a portion of web 22 that will be exposed upon installation, the exposed portion including shingle tabs 50 (see FIG. 4).

Figure 8:
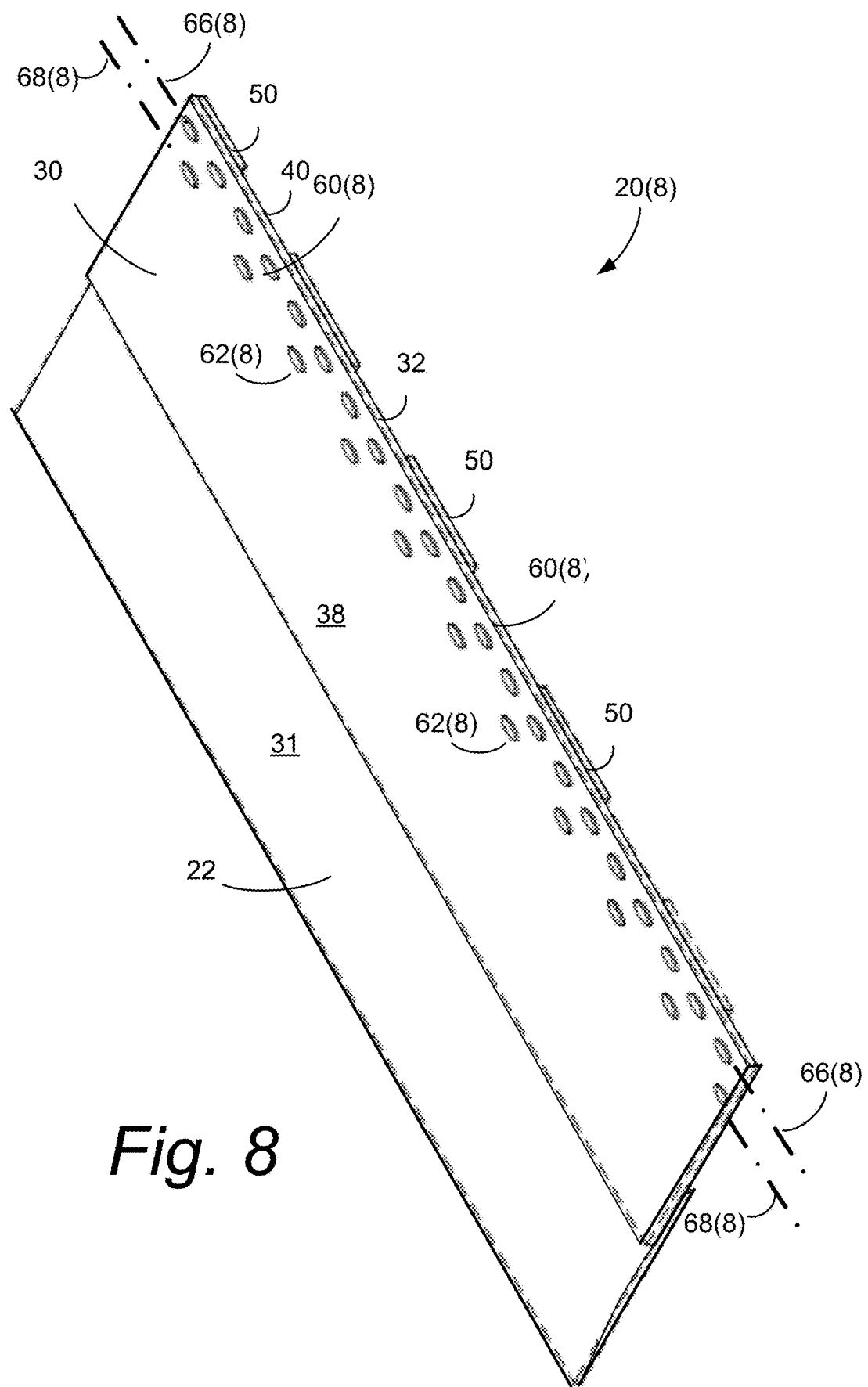
FIG. 8 is a plan view of a roofing shingle according to a second example embodiment and mode.

The roofing shingle 20 of FIG. 1-FIG. 8 comprises a first series of sealant material sites 60 and a second series of sealant material sites 62 provided on the shingle 20. FIG. 1-FIG. 7 show the material sites 60 as being provided on face 24 of shingle 20; FIG. 8 shows the material sites as being provided on a rear surface of shingle 20(8), e.g., on backing sheet rear surface 38.

For the embodiment of FIG. 1-FIG. 7, FIG. 4 shows an enlarged portion of roofing shingle 20 and various relationships between the material sealant sites of the same series and the material sealant sites of different series. The sealant material sites 60 of the first series are provided along a first sealant axis 66 which is essentially parallel to the length dimension L of the web 22. The sealant material sites 60 of the first series are discontinuous along the first sealant axis 66 and are discrete and separated from one another along the first axis 66 by a first interval 70.

The sealant material sites 62 of the second series are provided along a second sealant axis 68 which is essentially parallel to the length dimension L of the web 22. With respect to the width dimension W of the shingle, the second series of sealant material sites 62 is farther than the first series of sealant material sites 60 to the first length edge 26 of the shingle, e.g., the second sealant axis 68 is farther from first length edge 26 than first sealant axis 66. As such, the first sealant axis 66 and second sealant axis 68 are spaced apart by a distance D with respect to the width dimension W. Moreover, as shown in each of FIG. 1-FIG. 9, the first axis 66 of the sealant material sites 60 of the first series and the second axis 68 of the sealant material sites 62 of the second series are spaced away from the tabs 50 in the width dimension W. Both the first sealant axis 66 and the second sealant axis 68 extend from the left width edge 28 to the right width edge 29 of web 22.

Figure 4:
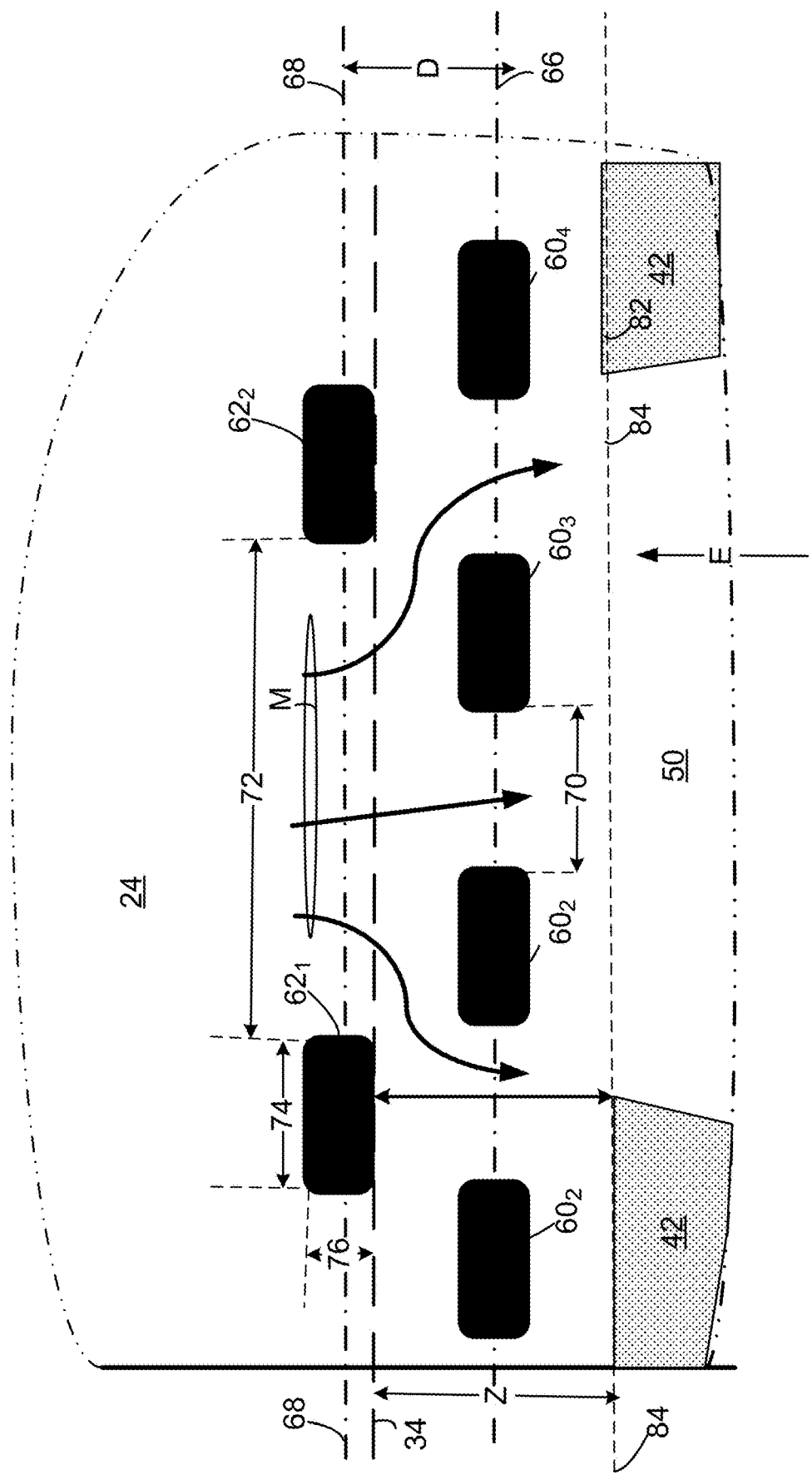
FIG. 4 is an enlarged view of a portion of the roofing shingle of FIG. 1
Figure 5:
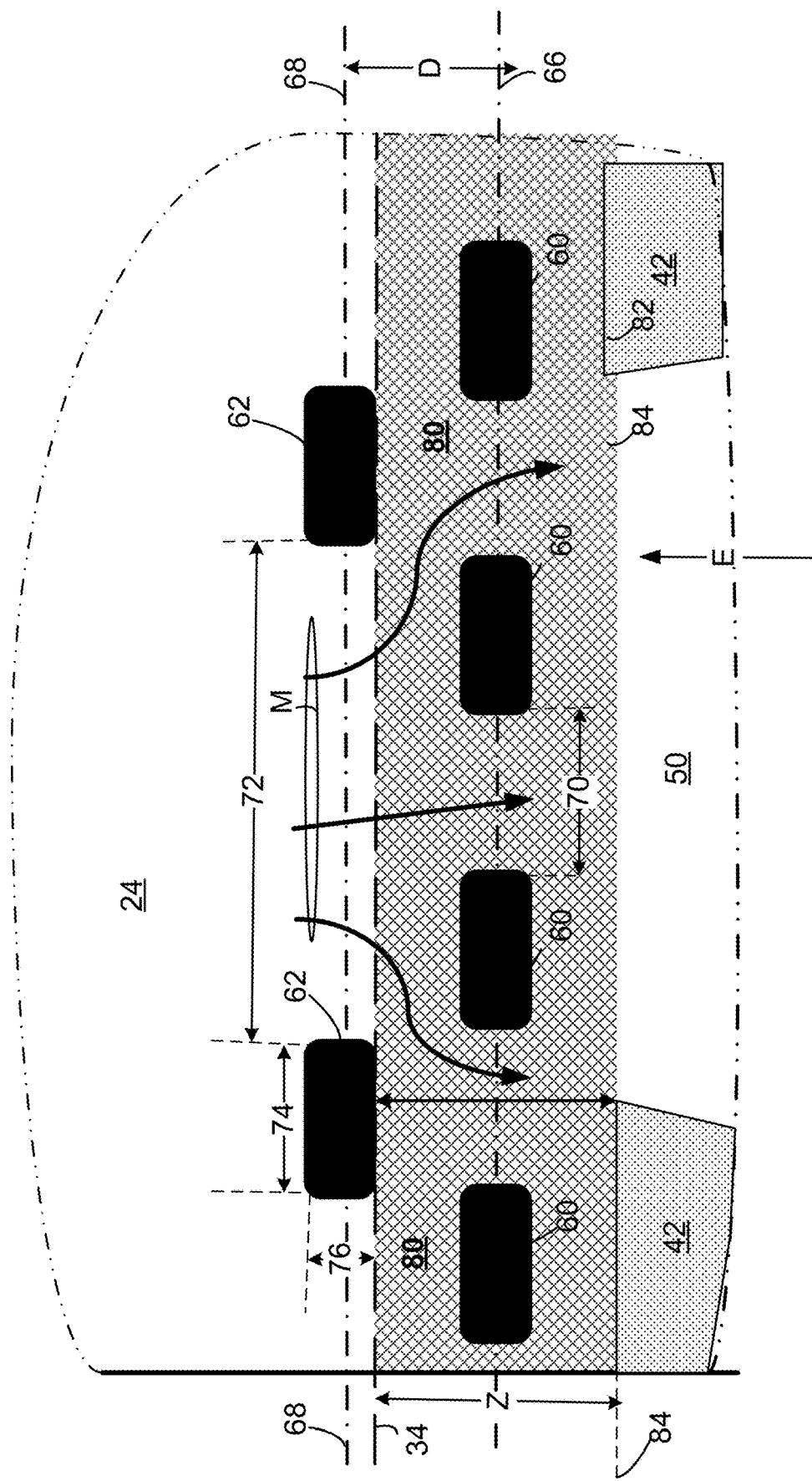
FIG. 5 is a plan view of the enlarged roofing shingle portion of FIG. 4 which is shaded to show a nailing zone.

Both the sealant material sites 60 of the first series and sealant material sites 62 of the second series may comprise deposits of adhesive material, such as an asphalt that has been modified with a thermoplastic such-as; SBS Styrene-Butadiene, Rubber, Latex modifier, polyethylene, GTR (ground Tire Rubber) and polypropylene, for example. Non-asphalt sealant materials may also be utilized as the sealant material sites 60. The adhesive property of the sealant material sites 60 of the first series and sealant material sites 62 of the second series facilitate adherence to an overlaid shingle, e.g., to a shingle which overlays the roofing shingle 20 which bears the sealant material sites. As shown in FIG. 4, the sealant material sites 60 of the first series and sealant material sites 62 of the second series each have essentially the same shape or configuration, such as a rounded rectangle, e.g., a rectangle with rounded or beveled corners. Other shapes and configurations are also possible. In the example embodiment and mode shown in FIG. 4, each sealant material site has sealant material site length 74 in the length dimension L, and a sealant material site width of 76 in the width dimension W. Each of first sealant axis 66 and second sealant axis 68 extend substantially through a center of the width of the sealant material sites that are aligned along the respective axes.

In an example embodiment and mode shown in FIG. 4, with respect to the length dimension L, a first site $62_1$ of the second series of sealant material sites 62 is substantially aligned between neighboring first and second sites $60_1$, $60_2$, respectively of the first series of sealant material sites 60, and a second site $62_2$ of the second series of sealant material sites 62 which neighbors the first site $62_1$ of the second series of sealant material sites 62 is substantially aligned between neighboring third and fourth sites $60_3$, $60_4$, respectively, of the first series of sealant material sites 60. This pattern may continue over the length of the shingle.

The second interval 72 which separates the sealant material sites 62 of the second series along the second axis 68 is thus different than the first interval 70 which separates the sealant material sites 60 of the first series along the first sealant axis 66. In an example embodiment and mode of FIG. 4, the second interval 72 is greater than the first interval 70. This means that the first series of sealant material sites has more sealant material sites, and thus more sealant/adhesive material, than the second series of sealant material sites.

The difference between the second interval 72 and first interval 70 offers several advantages. A first advantage is that a lower edge of the roofing shingle 20 is provided with greater adhesion potential, e.g., greater attractive force to an overlying shingle. Provision of greater sealant/adhesion is beneficial since environmental forces such as wind tend to pry beneath the overlying shingle from the lower edge of the underlying roofing shingle 20, e.g., from the direction of the eaves or lower portion of the roof, e.g., in the direction E shown in FIG. 4.

A second advantage in having interval 72 be greater than interval 70 is that a fewer number of sealant material sites 62 of the second series saves cost of production in requiring less sealant/adhesive material.

A third advantage in having interval 72 be greater than interval 70 is that the greater second interval 72 for the sealant material sites 62 of the second series better promotes water drainage and dissipation, should water or moisture leak between the roofing shingle 20 and an overlaid shingle. As shown in FIG. 4, any water or moisture on the roof is more likely to ingress between shingles from the apex of the roof. Accordingly, water or moisture may drain in various downward directions, such as the directions of arrows M as shown in FIG. 4. With a greater second interval 72, and fewer sealant material sites 62 of the second series, there is less sealant blockage to water from above along the sealant material sites 62 of the second series, and thus better downward drainage opportunities. Minimizing moisture between shingles is very important, even on roofs in which galvanized nails may be used to install the shingles.

As mentioned before, backing sheet first length edge 32 is substantially aligned with the first length edge 26 of the shingle. That is, the backing sheet first length edge 32 is directly beneath the first length edge 26 of the shingle tabs 50 of web 22. However, since the backing sheet 30 has smaller width than web 22, the backing sheet rear length edge 34 underlies the web 22, and is preferably substantially aligned under the web 22 with at least a lower edge 78 of the sealant material sites 62 of the second series (see FIG. 4). As such, the edge 78 of the sealant material sites 62 essentially overlies backing sheet rear length edge 34. In some drawings, therefore, only one of backing sheet rear length edge 34 or edge 78 of the sealant material sites 62 may be shown for sake of simplicity.

Whereas the example embodiment and mode of FIG. 1-FIG. 7 shows the material sites 60 as being provided on face 24 of the web 22; FIG. 8 shows the material sites as being provided on a rear surface of shingle 20(8), such as backing sheet rear surface 38. All foregoing descriptions of the sealant sites 60 of example embodiment and mode of FIG. 1-FIG. 7, including but not limited to the nature, configuration, intervals, composition, advantages, etc., are applicable also for the sealant sites 60(8) and 62(8) of embodiment and mode of FIG. 8, except that the sealant cites 60(8) and 62(8) are provided along first sealant axis 66(8) and second sealant axis 68(8) that are on the backing sheet rear surface 38 rather than on web face 24. In the example embodiment and mode of FIG. 8, first sealant axis 66 is slightly spaced away from and parallel to the backing sheet first length edge 32 on the backing sheet rear surface 38, and second sealant axis 68 is slightly more spaced away from and parallel to the backing sheet first length edge 32 on the backing sheet rear surface 38.

The description of the sealant material sites 60 of the first series and the sealant material sites 62 of the second series, and the first interval 70 and the second interval 72, has been described above in the context of a laminated roofing shingle 20 comprising two layers, e.g., web 22 and backing sheet 30. It should be understood, however, that the configuration and arrangement of the sealant material sites 60 of the first series and sealant material sites 62 of the second series and their respective infra-series intervals 70, 72 may be applied to single layer shingles, and at least some of the comparable advantages may also be obtained in single layer shingles. For example, in an embodiment and mode corresponding to FIG. 1-FIG. 4, the sealant material sites 60 may be provided on face 24 of a single layer shingle, or in an embodiment and mode corresponding to FIG. 8, the sealant material sites 60 may be provided on a rear surface of a single layer shingle.

Another advantage of the roofing shingle 20 herein described is an enhanced nailing zone 80. In an example embodiment and mode, the one or more cut-outs 40 of web 22 comprise a cut-out upper length edge 82 that is parallel to the length dimension L of the shingle. The cut-out upper length edges 82 of the plural cut-outs 40 are aligned along cut-out axis 84 along the length dimension L of the roofing shingle 20. The nailing zone 80 extends between the edge 78 of the sealant material sites 62 and the cut-out axis 84, and is defined by the left width edge 28, right width edge 29, edge 78 of the sealant material sites 62, and cut-out axis 84, as shown in FIG. 2-FIGS. 5 and 7. FIG. 4 differs from FIG. 5 by showing the nailing zone 80 with hatching. Advantageously, applying a nail in the nailing zone 80 causes the nail to penetrate both the web 22 and the backing sheet 30 of the roofing shingle 20, as well as the top lap or upper portion of an underlying roofing shingle.

Figure 6:
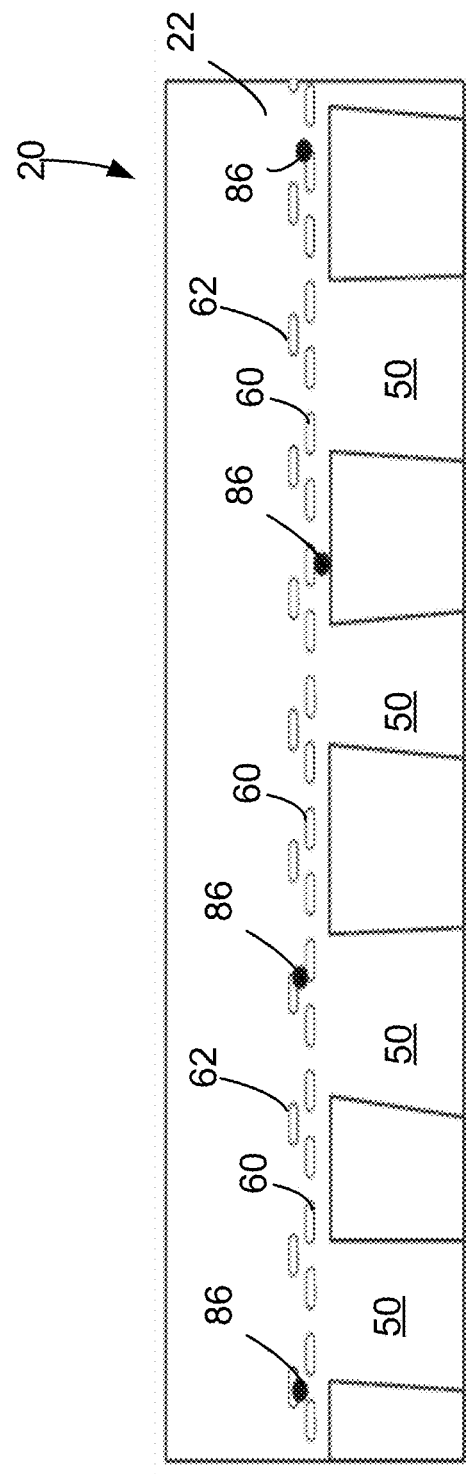
FIG. 6 is a plan view of the roofing shingle of FIG. 1 and further showing four nails situated randomly with respect to the width of a nailing zone.
Figure 7:
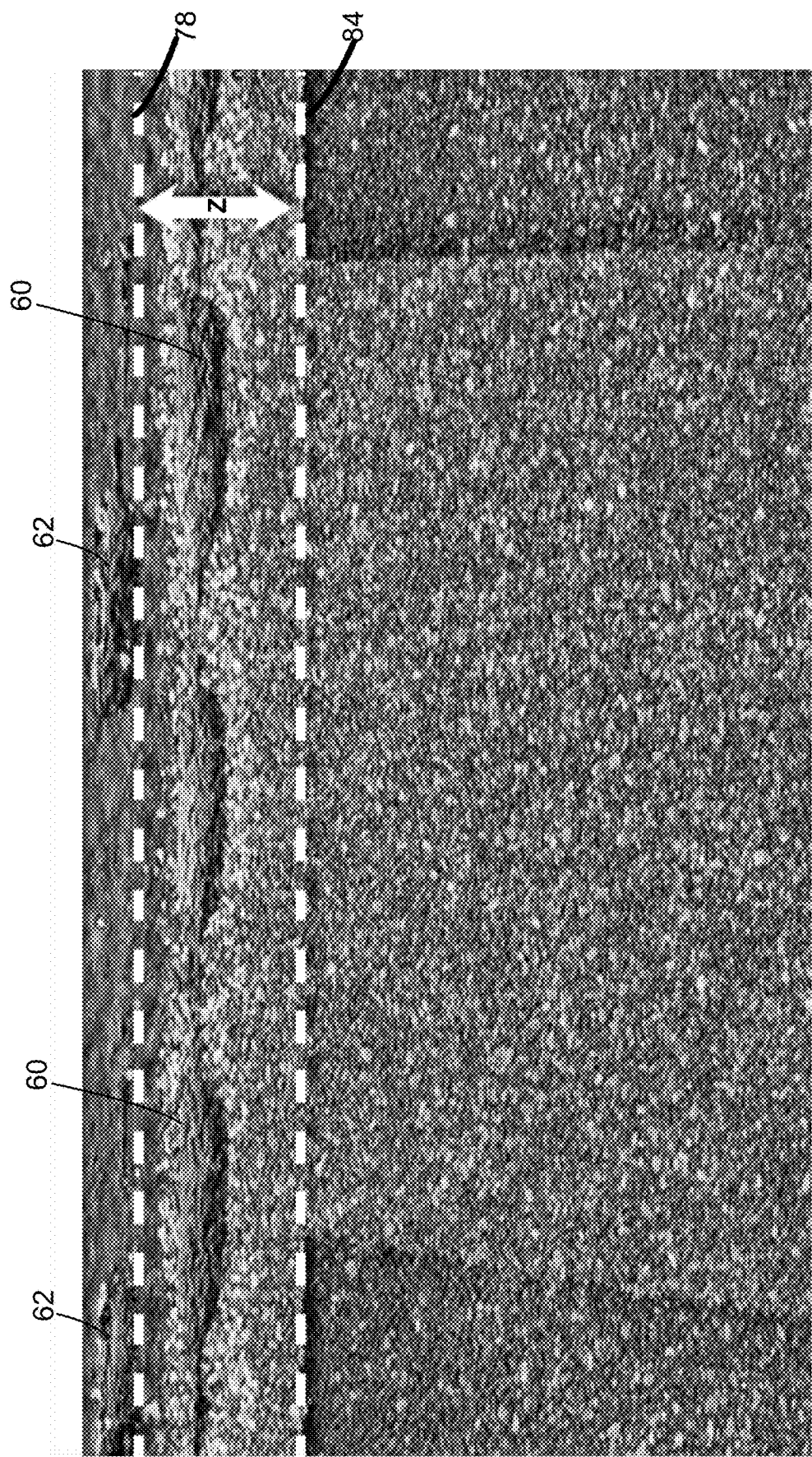
FIG. 7 is an enlarged view of a portion of the roofing shingle of FIG. 1 also showing a nailing zone.

FIG. 6 shows that plural nails 86 may be utilized in the nailing zone 80 to apply roofing shingle 20 to a roof, e.g., through underlayment membrane into a roof deck. For an example shingle of length dimension L=42 and width W=14, in accordance with some local building code regulations four nails 86 may be utilized. In such example embodiment, a nailing zone distance Z (see, e.g., FIG. 2) of the nailing zone 80 in the width dimension W from the cut-out axis 84 to the edge 78 of the sealant material sites 62 is substantially 1.5 inches. In an example implementation, with respect to the width dimension of the shingle the nailing zone is distanced substantially six inches from the first length edge of the shingle. The nailing zone 80 as bounded by the cut-out axis 84 and the edge 78 of the sealant material sites 62 is clearly visible so that the installer may easily determine where to apply the nails 86. Moreover, the substantial size of the nailing zone 80 provides the installer with considerable latitude as to where to install the nails 86 along the width dimension W of the roofing shingle 20. In addition, the size of the nailing zone enables the installer to apply the nails 86 at any point within the nailing zone 80, and without regard to slope of the roof. In prior art roofing installation the slope of the roof was a limiting factor for placement of the nails, e.g., in order to assure that the nail penetrated not only the roofing shingle 20 but also an underlying shingle. The substantial nailing zone 80 of the technology disclosed herein provides greater assurance that the nails 86 penetrate and secure the roofing shingle 20 and underlying shingles regardless of roof slope.

The fact that the there are fewer sealant material sites 62 of the second series than sealant material sites 60 of the first series provides an additional advantage of less possibility for the installer to accidentally insert a nail 86 through a sealant material site, thereby essentially substantially reducing the opportunity for the installer to gum up a nail gun by driving a nail through sealant material/adhesive.

Each sealant material site 60 essentially serves as an anchor point for an adjacent shingle, whether an overlaying adjacent shingle in the case of the example embodiment and mode of FIG. 1-FIG. 7, or an underlying adjacent shingle in the case of the example embodiment and mode of FIG. 8. In one of its example aspects various embodiments and modes of roofing shingles described herein have a predetermined number of discontinuous sealant material sites 60 chosen, located, and/or formed to avoid interference with fasteners such as nails 86. In an example implementation, the predetermined number of discontinuous sealant material sites 60 is chosen to exceed a ratio relative to a number of nails per shingle required by local building regulations. The predetermined number of discontinuous sealant material sites 60 of the shingles described herein is in a ratio of at least 3:1 to the number of nails per shingle required by local building regulations. For example, in a high-wind or storm/hurricane area, local building regulations may require six nails per shingle. Accordingly, in an example embodiment and mode, the predetermined number of discontinuous sealant material sites 60 is eighteen or more. More preferably, for a shingle having length L=42, the ratio may exceed 5:1, with a preferred number of discontinuous sealant material sites 60 being thirty-two.

Figure 9:
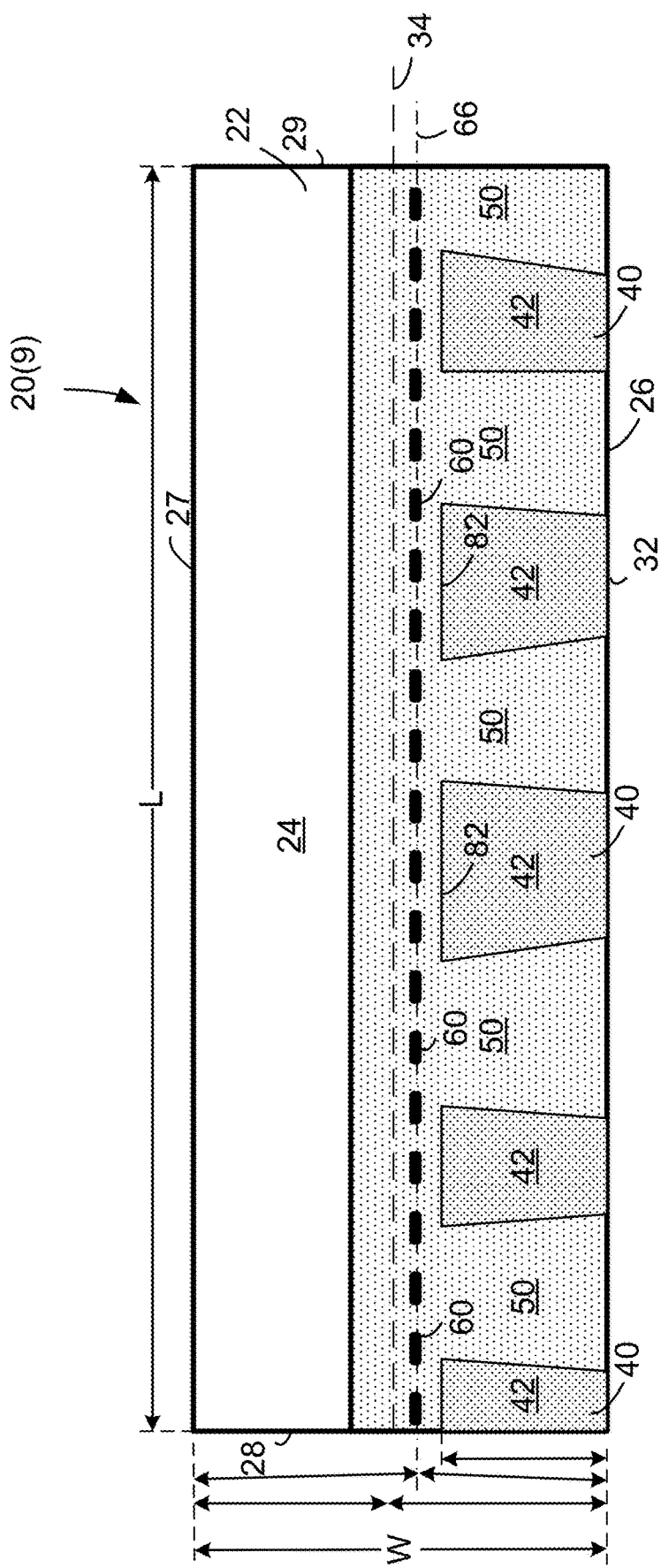
FIG. 9 is a plan view of a roofing shingle according to a second example embodiment and mode wherein one series of sealant material sites are provided in a number and/or manner to avoid interference with nails/nailing.

FIG. 9 shows another example embodiment and mode of shingle 20(9) that includes sealant material sites 60, but only the first series of sealant material sites 60. The example embodiment and mode of FIG. 9 differs from the example embodiment and mode of FIG. 1-FIG. 7, or the example embodiment and mode of FIG. 8, only by omission of the second series 62 of sealant material sites. In all other respects the shingle 20(9) of FIG. 9 is essentially identical to the shingle 20 of the embodiment and mode of FIG. 1-FIG. 7 or the shingle 20(8) of FIG. 8. The example embodiment and mode of FIG. 9 shows a shingle having at least eighteen discontinuous sealant material sites 60. For a shingle having length L of substantially 42, at least eighteen and preferably substantially 32 sealant material sites 60 are provided. The number of discrete sealant material sites 60 thus afford sufficient sealing with an adjacent shingle, but are numbered in a manner to avoid likelihood of being nailed through so as to avoid interfering with the nailing attachment.

In another of its aspects the technology disclosed herein concerns methods of installing roofing shingles on a roof. The methods described herein may be applicable to any of the example embodiment and modes of shingles herein described, such as, for example, shingle 20, shingle 20(8), and shingle 20(9). Each of the shingles comprises a web configured with a length dimension of L=C*I units of measure, L and I being even integers of a measurement unit and C being an odd integer of the measurement unit. FIG. 11 shows example acts or steps involved in a generic mode of a roofing method. The generic mode of FIG. 11 and other modes such as FIG. 12 described herein refer to courses of installation and offsets or increments. In general, a "course" of shingles can be conceptualized as a row of shingles extending in a length direction of the roof, with each course of row progressing from, e.g., at least partially overlapping, a previous course in a direction from the eaves to the peak of the roof.

Act 11-1 comprises, for a first course of installation, applying an entire shingle to the underlayment of the roof. It should be understood that, if the method begins near the eaves of the roof, a starter shingle may have first been applied in customary manner. As using herein, "applying" or "application" may refer to any technique of affixing or securing the roofing shingle 20 to the roof, such as by using a fastener, such as nails 86 or staples, for example.

Act 11-2 comprises, for each of X=2, . . . J courses of installation, J being an integer, two sub-acts, e.g, sub-act 11-2(a) and sub-act 11-2(b). Sub-act 11-2(a) comprises forming from an $X^{th}$ shingle, an $X^{th}$ shingle major portion having a length L−((X−1)*I) and a $X^{th}$ shingle minor portion having a length L−L−((X−1)*I. Sub-act 11-2(b) comprises applying the Xth shingle major portion over at least a portion of an $(X-1)^{th}$ shingle major portion, e.g., a shingle major portion of the underlying shingle of the previous course, and to the underlayment.

Act 11-3 comprises, for each of Y=J+1, . . . C courses of installation, applying one of the $X^{th}$ shingle minor portions over at least a portion of course Y−1 and to the underlayment. In the method of FIG. 11, edges of the shingle major portions and shingle minor portions applied for courses 2–C are preferably substantially aligned in the length dimension with an edge of the entire shingle applied for the first course.

In generic embodiment and mode may further comprise applying the shingle major portions and the shingle minor portions of the respective courses by affixing or nailing the shingle major portions and the shingle minor portions in a nailing zone of the respective shingle major portions and the shingle minor portions.

In the generic and other example embodiment and modes, the method further comprises, after performing acts (1)-(3), applying one or more entire shingles to each of the C courses to abut or overlap a shingle, a shingle major portion, or a shingle minor portion already in the respective course, to fill out the longitudinal dimension of the roof along the respective course. The method may further optionally comprise installing further courses up the roof toward the peak according to acts (1)-(3).

Figure 12:
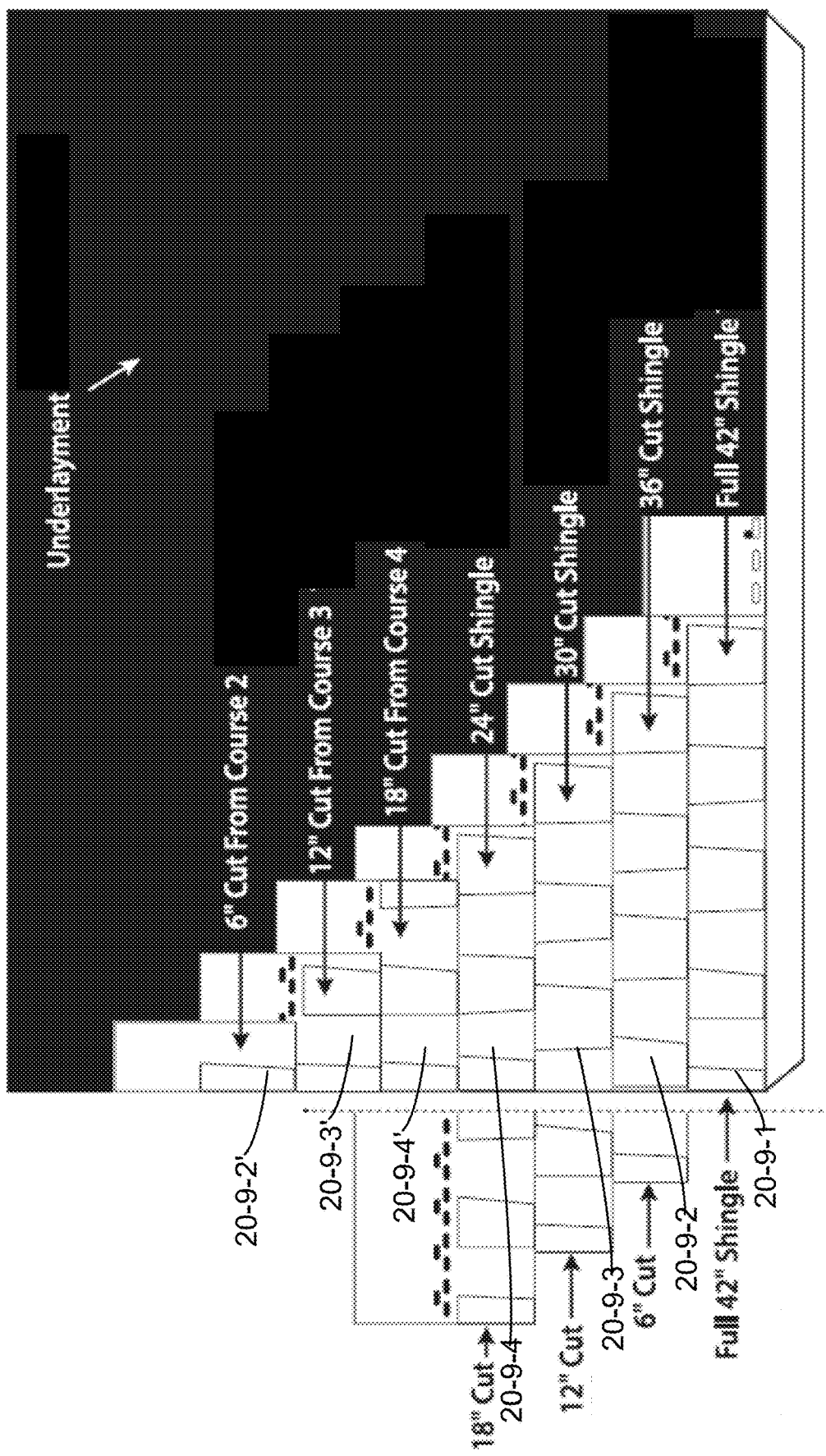
FIG. 12 is a top view of a roof and showing installation of seven courses of shingles in accordance with an example mode of roofing shingle installation.

FIG. 12 shows how the generic method of FIG. 11 can be implemented using a particular roofing shingle, such as shingle 20, shingle 20(8), or shingle 20(9), for example. In the FIG. 12 example, a ratio of the length dimension L of the shingle to the width dimension W of the shingle is 3:1. The web 22 of each shingle is configured with a width W in a width dimension, and wherein W=L/3. In an example implementation, a length of the shingle along the length dimension is 42 inches and a width of the shingle along the width dimension is 14 inches. In the example implementation of FIG. 12, the length of the second interval 72 is three inches and the length of the first interval 70 is one inch. As such, a ratio of the second interval 72 to the first interval 70 may be 3:1. In the example embodiment and mode of FIG. 12, the sealant material sites of the first series and the second series have a length 74 in the length dimension of substantially 1 inch and a width 76 in the width dimension of substantially ⅜ inch. The nailing zone distance Z is substantially 1.5 inches.

Thus, in the example embodiment and mode of FIG. 12, L=42, C=7, and I=6. The method of FIG. 12 further comprises the following acts 9-(i) through 9-(vii):

9-(i): for the first course of installation, applying an entire first shingle 20-9-1 to the underlayment of the roof.

9-(ii) for the second course of installation, removing a 6 inch length of a second shingle 20-9-2 and applying a remaining 36 inch portion of the second shingle over a portion of the first shingle 20-9-1 and to the underlayment whereby along the length dimension an edge of the first shingle 20-9-1 is substantially aligned with an edge of the remaining 36 inch portion of the second shingle 20-9-2.

9-(iii) for the third course of installation, removing a 12 inch length of a third shingle 20-9-3 and applying a remaining 30 inch portion of the third shingle 20-9-3 over a portion of the 36 inch portion of the second shingle 20-9-2 and to the underlayment whereby along the length dimension an edge of the 36 inch portion of the second shingle 20-9-2 is substantially aligned with an edge of the remaining 30 inch portion of the third shingle 20-9-3.

9-(iv) for the fourth course of installation, removing an 18 inch length of a fourth shingle 20-9-4 and applying a remaining 24 inch portion of the fourth shingle 20-9-4 over a portion of the 30 inch portion of the third shingle 20-9-3 and to the underlayment whereby along the length dimension an edge of the 30 inch portion of the third shingle 20-9-3 is substantially aligned with an edge of the remaining 24 inch portion of the fourth shingle 20-9-4.

9-(v) for the fifth course of installation, applying a removed 18 inch length of shingle 20-9-4' over a portion of the 24 inch portion of the fourth shingle 20-9-4 and to the underlayment whereby along the length dimension an edge of the 24 inch portion of the fourth shingle 20-9-4 is substantially aligned with an edge of the removed 18 inch length of shingle 20-9-4'.

9-(vi) for the sixth course of installation, applying a removed 12 inch length of shingle 20-9-3' over the removed 18 inch length of shingle 20-9-4' and to the underlayment whereby along the length dimension an edge of the removed 18 inch length of shingle 20-9-4' is substantially aligned with an edge of the removed 12 inch length of shingle 20-9-3'.

9-(vii) for the seventh course of installation, applying a removed 6 inch length of shingle 20-9-2' over the removed 12 inch length of shingle 20-9-3' and to the underlayment whereby along the length dimension an edge of the removed 12 inch length of shingle 20-9-3' is substantially aligned with an edge of the removed 6 inch length of shingle 20-9-2'.

In an example implementation, the removed 18 inch length of shingle 20-9-4' is removed from the fourth shingle 20-9-4; the removed 12 inch length of shingle 20-9-3' is removed from the third shingle 20-9-3; and the removed 6 inch length of shingle 20-9-2' is removed from the second shingle 20-9-2.

As mentioned above, the method of the example embodiment and mode of FIG. 12 may further comprise applying one or more entire shingles to each of the seven courses to abut a shingle, a shingle major portion, or a shingle minor portion already in the respective course, to fill out the longitudinal dimension of the roof along the respective course. The method of FIG. 12 may further optionally comprise installing further courses up the roof toward the peak according to acts (1)-(3) of FIG. 11.

In the example embodiment and mode of FIG. 12, 56 shingles are installed per average square with substantially no shingle waste. On average, eight fewer shingles are utilized per square. Thus, on a 40 square job/roof, the example embodiment and mode requires 6400 fewer nails, 320 fewer shingles, and 2-4 hours less in installation time.

Figure 10:
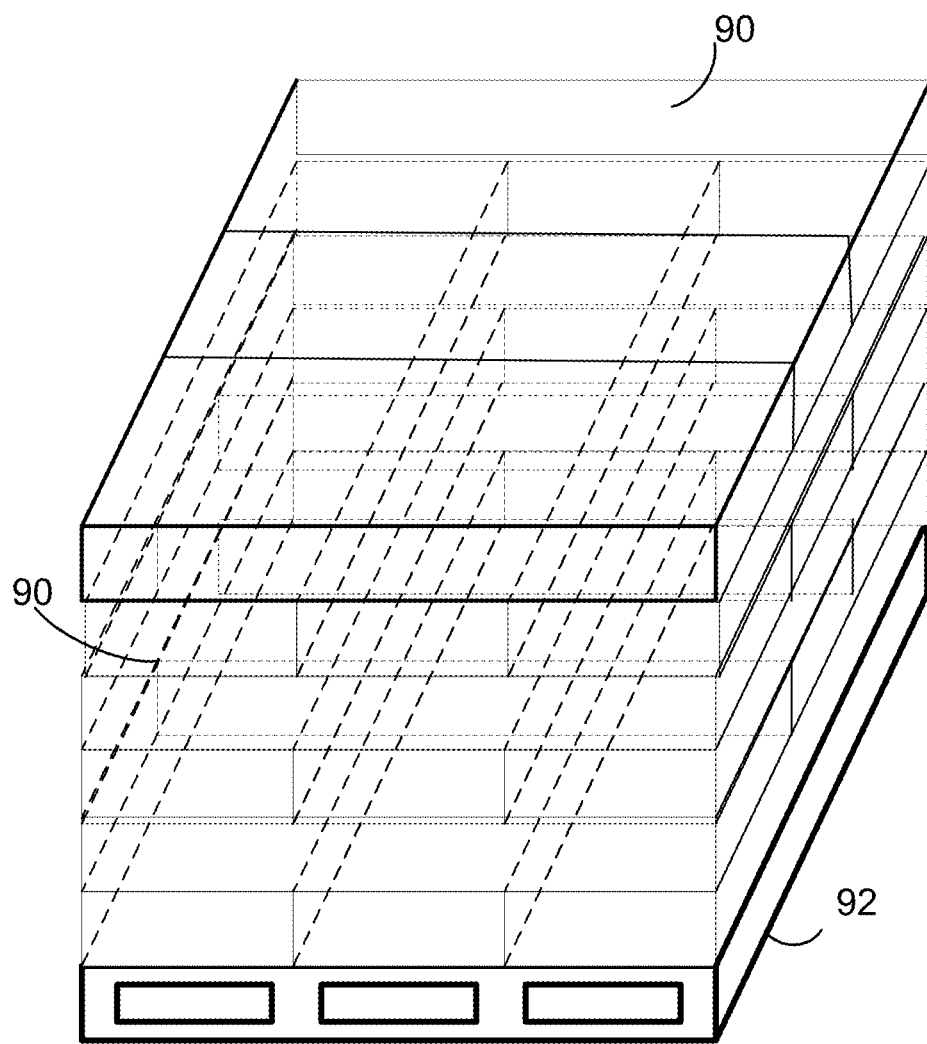
FIG. 10 is a perspective view of a pallet upon which plural packages of shingles may be stored in an essentially square configuration.

A shingle of length L being substantially 42 and width W of substantially 14 has several advantages, as understood from the foregoing. Another example advantage is that the plural packages 90 of shingles may be stored in a substantially square pattern on a loading or storage pallet 92, for example. For example, FIG. 10 shows storing three such packages 90 of shingles abreast on a square pallet 92. Successive layers of shingle packages 90 may be stacked above the base or lowest row of shingles, preferably with differing orientation of package layers. For example, the lowest or base layer may be in a north-south orientation, with the next highest layer being in an east-west orientation, and a yet succeeding (third) layer being in the north-south orientation. Any number of layers may be stacked in this manner, each layer being essentially square in footprint. The number of layers may be chosen so as to give the entire pallet load a cubic shape. Storage of packages 90 of shingles in an essentially perfect square facilitates even weight distribution from successively layers that may stacked on the pallet 92. Even weight distribution is preferable to have imbalance or partial overhang of a packages 90 of shingles, particularly in view of the thermoplastic nature of the shingles, so as not to damage shingles.

As used herein, "lower" generally connotes a lower direction, e.g., in the direction of eves of a roof, rather than apex. Conversely, "upper" or "higher" refers to an apex direction of a roof. Such terms are understood to include reference to orientation of a shingle as the shingle is intended to be installed on a roof. Further, any reference to "substantially" or "essentially" or "approximately" in terms of distance or dimension or displacement means within 0.50 inch, plus or minus. When not used in terms of length, these words mean plus or minus 5% of the property or quantity mentioned.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Additionally, it is intended that such equivalents include both currently known equivalents as well as equivalents developed in the future, i.e., any elements developed that perform the same function, regardless of structure. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A roofing shingle comprising:
a web of roofing material configured with a length dimension and a width dimension, along the length dimension the web comprising a lower length edge which upon installation on a roof will be lower on the roof than an upper length edge, the web comprising a plurality of tabs;
a first series of sealant material sites provided on the shingle, the sealant material sites of the first series being provided along a first axis which is essentially parallel to the length dimension of the web; the sealant material sites of the first series being discontinuous along the first axis;
a second series of sealant material sites provided on the shingle, the sealant material sites of the second series being provided along a second axis which is essentially parallel to the length dimension of the web and spaced apart from the first axis with respect to the width dimension; the second axis being farther from the lower length edge of the roofing shingle than the first axis; the sealant material sites of the second series being discontinuous along the second axis;
wherein the first series of sealant material sites has more sealant material than the second series of sealant material sites; and
wherein the first axis and the second axis are spaced away from the tabs in the width dimension.

2. The roofing shingle of claim 1, wherein both the first series of sealant material sites and the second series of sealant material sites are provided on an upper face of the shingle.

3. The roofing shingle of claim 1, wherein
the sealant material sites of the first series are discrete and are separated from one another along the first axis by a first interval;
the sealant material sites of the second series are discrete and are separated from one another along the second axis by a second interval, the second interval being different than the first interval; and
the second interval is greater than the first interval.

4. The roofing shingle of claim 3, wherein a ratio of length of the second interval to the first interval is 3:1.

5. The roofing shingle of claim 3, wherein the sealant material sites of the first series and the second series have a length in the length dimension of substantially 1 inch and a width in the width dimension of substantially ⅜ inch.

6. The roofing shingle of claim 1, wherein the lower length edge of the shingle along the length dimension comprises at least one cut-out to form the plurality of tabs, and wherein with respect to the width dimension of the shingle the second series of sealant material sites is farther than the first series of sealant material sites from the lower length edge of the shingle.

7. The roofing shingle of claim 6, wherein the at least one cut-out comprises a cut-out length edge that is parallel to the length dimension of the shingle, and wherein a nailing zone distance of a nailing zone in the width dimension from the cut-out length edge to the second series of sealant material sites is substantially 1.5 inches.

8. The roofing shingle of claim 7, wherein with respect to the width dimension of the shingle the nailing zone is substantially six inches from the first length edge of the shingle.

9. The roofing shingle of claim 1, further comprising a backing sheet secured to a lower surface of the web, the lower surface of the web being opposite a face of the web, the backing sheet being configured with essentially a same length dimension as the web but with a smaller width dimension than the web, a first length edge of the backing sheet being aligned with the lower length edge of the shingle and a second length edge of the backing sheet being substantially aligned under the web with at least an edge of the sealant material sites of the second series.

10. The roofing shingle of claim 1, wherein a ratio of the length dimension of the shingle to the width dimension of the shingle is 3:1.

11. The roofing shingle of claim 10, wherein a length of the shingle along the length dimension is 42 inches and a width of the shingle along the width dimension is 14 inches.

12. The roofing shingle of claim 11, wherein the lower length edge of the shingle along the length dimension comprises at least one cut-out to form the plurality of tabs, and wherein an extent of the tabs from the first length edge of the shingle in the width dimension of the shingle is 6 inches.

13. The roofing shingle of claim 12, wherein the length of the second interval is three inches and the length of the first interval is one inch.

14. The roofing shingle of claim 1, wherein with respect to the length dimension a first site of the second series of sealant material sites is substantially aligned between neighboring first and second sites of the first series of sealant material sites, and a second site of the second series of sealant material sites which neighbors the first site of the second series of sealant material sites is substantially aligned between neighboring third and fourth sites of the first series of sealant material sites.

15. The roofing shingle of claim 1, wherein the sealant material sites of the first series of sealant material sites and the sealant material sites of the second series of sealant material sites are uniform in size.

16. A roofing shingle comprising:
a web of roofing material configured with a length dimension and a width dimension, along the length dimension the web comprising a lower length edge which upon installation on a roof will be lower on the roof than an upper length edge;
a first series of sealant material sites provided on the shingle, the sealant material sites of the first series being provided along a first axis which is essentially parallel to the length dimension of the web; the sealant material sites of the first series being discontinuous along the first axis and discrete and separated from one another along the first axis by a first interval;
a second series of sealant material sites provided on the shingle, the sealant material sites of the second series being provided along a second axis which is essentially parallel to the length dimension of the web and spaced apart from the first axis with respect to the width dimension; the second axis being farther from the lower length edge of the roofing shingle than the first axis; the sealant material sites of the second series being discontinuous along the second axis and discrete and separated from one another along the second axis by a second interval, the second interval being greater than the first interval;
wherein with respect to the length dimension a first site of the second series of sealant material sites is substantially aligned between neighboring first and second sites of the first series of sealant material sites, and a second site of the second series of sealant material sites which neighbors the first site of the second series of sealant material sites is substantially aligned between neighboring third and fourth sites of the first series of sealant material sites; and
wherein a ratio of length of the second interval to the first interval is 3:1.

17. The roofing shingle of claim 16, wherein both the first series of sealant material sites and the second series of sealant material sites are provided on an upper face of the shingle.

18. The roofing shingle of claim 16, wherein the lower length edge of the shingle along the length dimension comprises at least one cut-out to form the plurality of tabs, and wherein with respect to the width dimension of the shingle the second series of sealant material sites is farther than the first series of sealant material sites from the first length edge of the shingle.

19. The roofing shingle of claim 16, further comprising a backing sheet secured to a lower surface of the web, the lower surface of the web being opposite a face of the web, the backing sheet being configured with essentially a same length dimension as the web but with a smaller width dimension than the web, a first length edge of the backing sheet being aligned with the lower length edge of the shingle and a second length edge of the backing sheet being substantially aligned under the web with at least an edge of the sealant material sites of the second series.

20. The roofing shingle of claim 16, wherein the sealant material sites of the first series of sealant material sites and the sealant material sites of the second series of sealant material sites are uniform in size.

21. A roofing shingle comprising:
a web of roofing material configured with a length dimension and a width dimension, along the length dimension the web comprising a lower length edge which upon installation on a roof will be lower on the roof than an upper length edge;
a first series of sealant material sites provided on the shingle, the sealant material sites of the first series being provided along a first axis which is essentially parallel to the length dimension of the web; the sealant material sites of the first series being discontinuous along the first axis and discrete and separated from one another along the first axis by a first interval;
a second series of sealant material sites provided on the shingle, the sealant material sites of the second series being provided along a second axis which is essentially parallel to the length dimension of the web and spaced apart from the first axis with respect to the width dimension; the second axis being farther from the lower length edge of the roofing shingle than the first axis; the sealant material sites of the second series being discontinuous along the second axis and discrete and separated from one another along the second axis by a second interval, the second interval being greater than the first interval, wherein a ratio of length of the second interval to the first interval is 3:1.

22. The roofing shingle of claim 21, wherein the sealant material sites of the first series of sealant material sites and the sealant material sites of the second series of sealant material sites are uniform in size.

* * * * *